US 7,508,733 B2

(12) United States Patent
Haldorsen

(10) Patent No.: US 7,508,733 B2
(45) Date of Patent: Mar. 24, 2009

(54) HIGH-FREQUENCY PROCESSING OF SEISMIC VIBRATOR DATA

(75) Inventor: Jakob B. U. Haldorsen, Norwalk, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/987,907

(22) Filed: Nov. 12, 2004

(65) Prior Publication Data
US 2005/0122840 A1    Jun. 9, 2005

Related U.S. Application Data

(60) Provisional application No. 60/520,175, filed on Nov. 14, 2003.

(51) Int. Cl.
G01V 1/36 (2006.01)
G01V 1/37 (2006.01)
(52) U.S. Cl. .............. 367/41; 367/40; 367/42; 367/189
(58) Field of Classification Search .......... 367/37–38, 367/40–42, 48, 57, 43, 189
See application file for complete search history.

(56) References Cited

U.S. PATENT DOCUMENTS

| 3,705,382 A | * | 12/1972 | Quay | 367/51 |
|---|---|---|---|---|
| 4,646,274 A | | 2/1987 | Martinez | 367/41 |
| 4,715,021 A | * | 12/1987 | Dittert | 702/17 |
| 4,926,391 A | * | 5/1990 | Rector et al. | 367/41 |
| 5,148,407 A | * | 9/1992 | Haldorsen et al. | 367/32 |
| 5,191,557 A | * | 3/1993 | Rector et al. | 367/41 |
| 5,400,299 A | * | 3/1995 | Trantham | 367/43 |
| 5,461,594 A | * | 10/1995 | Mougenot et al. | 367/48 |

(Continued)

FOREIGN PATENT DOCUMENTS

GB    2 365 529 A    2/2002

(Continued)

OTHER PUBLICATIONS

Haldorsen, J. B. U. et al. "Multichannel Wiener Deconvolution of Vertical Seismic Profiles", *Geophysics*, vol. 59 (Oct. 1994), pp. 1500-1511.

(Continued)

*Primary Examiner*—Jack W. Keith
*Assistant Examiner*—Scott A Hughes
(74) *Attorney, Agent, or Firm*—James McAleenan; Vincent Loccisano; Jody Lynn DeStefanis

(57) ABSTRACT

A method of processing seismic data obtained using a seismic vibrator that includes estimating travel times of direct wave arrivals between the seismic vibrator and an array of seismic receiver locations and wavefield deconvolving the seismic data using the direct wave arrival travel times. Also a related method of producing a high-frequency geological subsurface image that includes acquiring seismic data having significant harmonic energy using a seismic vibrator, estimating direct wave arrival travel times between the seismic vibrator and an array of seismic receiver locations, wavefield deconvolving the seismic data using the estimated direct wave arrival travel times, and using the wavefield deconvolved seismic data to produce a high-frequency geological subsurface image. A further related computer useable medium having computer readable program code means embodied therein practicing the inventive method.

18 Claims, 15 Drawing Sheets

U.S. PATENT DOCUMENTS

| | | | | |
|---|---|---|---|---|
| 5,550,786 | A | | 8/1996 | Allen .......................... 367/48 |
| 5,570,833 | A | | 11/1996 | Dusek ........................ 229/67.2 |
| 5,715,213 | A | | 2/1998 | Allen .......................... 367/48 |
| 5,721,710 | A | | 2/1998 | Sallas et al. .................... 367/41 |
| 5,790,473 | A | * | 8/1998 | Allen .......................... 367/57 |
| 5,946,271 | A | * | 8/1999 | Dragoset, Jr. ................. 367/38 |
| 6,131,694 | A | * | 10/2000 | Robbins et al. ............. 181/105 |
| 6,393,366 | B1 | * | 5/2002 | Saggaf ........................ 702/17 |
| 6,807,489 | B2 | * | 10/2004 | Naville et al. ................. 702/17 |
| 2004/0122596 | A1 | * | 6/2004 | Sudhakar et al. .............. 702/17 |

FOREIGN PATENT DOCUMENTS

WO  WO2004031806 A2  4/2004

OTHER PUBLICATIONS

Xiao-Ping Li. "Decomposition of Vibroseis Data by the Multiple Filter Technique". *Geophysics*, vol. 62, No. 3 (May-Jun. 1997, pp. 980-991.

* cited by examiner

HIGH-FREQUENCY PROCESSING OF SEISMIC VIBRATOR DATA

CROSS REFERENCE TO RELATED APPLICATION

This application claims priority from co-pending U.S. Provisional Patent Application No. 60/520,175, filed Nov. 14, 2003.

FIELD OF THE INVENTION

This invention relates to the processing of seismic data and, more particularly, to the processing of seismic data obtained using a vibratory seismic source where the processing method is able to utilize harmonic energy as signal rather than noise.

BACKGROUND

Vibratory seismic sources, typically referred to as seismic vibrators, are commonly used in connection with the acquisition of seismic data, such as vertical seismic profiling (VSP) data. A seismic vibrator is a low-impact (low amplitude), typically hydraulic, source programmed to generate a signal within a certain frequency range. The source's signal has a duration of several seconds, typically around 10 seconds, during which time the driving signal of the vibrator continuously changes from a minimum value, e.g. 8 Hertz, to a maximum value, e.g. 100 Hertz. The long signature is typically condensed to an approximate impulse by correlating the acoustic signals recorded by the seismic receivers with a reference signal, typically a recording of the synthetic sweep used to drive the vibrator. The correlated traces are typically truncated to a reasonable length, often to between 2 and 4 seconds, before further processing is done.

One commonly seen problem with seismic vibrators is that the response of the vibrator is non-linear such that the vibrator, in addition to the acoustic signal at the intended frequency, sends out energy at higher harmonics, or multiples of this frequency. For an upsweep signal (starting at low frequencies and ending at high frequencies) the harmonic energy represents a too-early occurrence of the higher frequencies. In the VSP context, when the recordings of the down-hole receivers are correlated with a reference signal that does not contain a proper description of this harmonic energy, the result is an asymmetric signal with the harmonic energy leading the main energy burst by a time determined by how much too early the (e.g. 60 Hertz) signal occurred. This lead-time may be several seconds for the higher frequencies, leaving some of the energy outside the time window saved for further processing, typically the part associated with the signal directly transmitted from the source to the receiver. However, the correlated section of data will contain improperly placed energy all over, mostly at higher frequencies, eventually limiting the useful bandwidth of the data. In addition to this, the correlated data will be limited to the same frequency band as the reference signal. The production of harmonic energy by seismic vibrators is typically difficult to predict and difficult to measure.

Other factors can also produce differences between the actual force imparted into the ground by a seismic vibrator and the signal intended to be imparted. Flexing of the vibrator base plate and variable ground coupling, for instance, can produce changes in the source signature other than harmonics.

At least two methods for attempting to address these types of differences are known. In one method, taught in U.S. Pat. Nos. 4,646,274, 5,550,786, 5,570,833, 5,715,213, and 5,721,710, one or more sensors are mounted to the vibrator (typically on the vibrator's baseplate) and signals from these sensors are used to estimate the actual source signature imparted by the vibrator. This estimate of the actual source signature is then used instead of the reference sweep to produce the correlated traces. While this type of method can offer significant advantages compared to the use of the reference sweep, this type of method typically does a less than perfect job of estimating the source signature actually imparted into the earth by the vibratory seismic source because a sensor mounted on the vibrator can only sense the outgoing seismic wavefield indirectly.

A second type of method, as taught for instance in WO2004031806 A2, involves attempting to quantitatively estimate the "noise" (i.e. the difference between the desired reference signal and the seismic signal actually imparted by the vibrator, such as harmonics) and then subtracting the transmitted "noise" from the received seismic signals. In practice, however, it is often very difficult to clearly distinguish between "noise", which one would like to remove from the data, and "signal" which must to be substantially retained to allow the subsurface to be adequately characterized.

For these reasons, it would be of great benefit to be able to process seismic data obtained from the use of a vibratory seismic source in a way that appropriately addresses the differences between the desired and actual source signatures and is able to use these differences in source signature, such as harmonics, as signal rather than noise to the maximum extent possible.

SUMMARY OF INVENTION

One aspect of the invention involves a method of processing seismic data obtained using a seismic vibrator that includes: estimating travel times of direct wave arrivals between the seismic vibrator and an array of seismic receiver locations and wavefield deconvolving the seismic data using the direct wave arrival travel times. Another aspect of the invention involves a method of producing a high-frequency geological subsurface image that includes acquiring seismic data having significant harmonic energy using a seismic vibrator, estimating direct wave arrival travel times between the seismic vibrator and an array of seismic receiver locations, wavefield deconvolving the seismic data using the estimated direct wave arrival travel times, and using the wavefield deconvolved seismic data to produce a high-frequency geological subsurface image. Another aspect of the invention involves a computer useable medium having computer readable program code means embodied therein that allows the inventive method to be carried out. Further details and features of the invention will become more readily apparent from the detailed description that follows.

BRIEF DESCRIPTION OF FIGURES

The invention will be described in more detail below in conjunction with the following Figures, in which.

DETAILED DESCRIPTION

Figure 1:
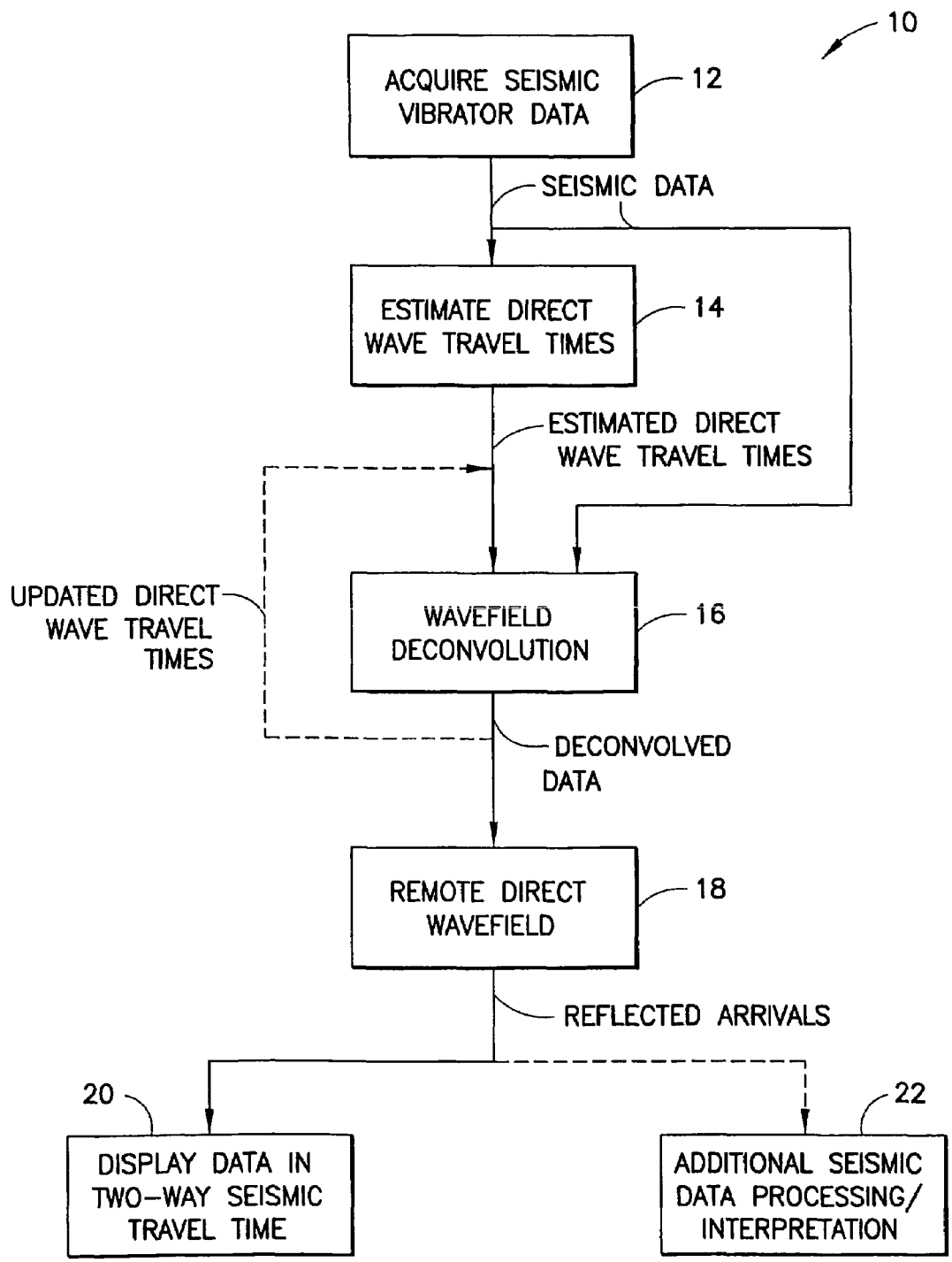
FIG. 1 is a flowchart depicting various processes associated with alternative embodiments of the present invention.

FIG. 1 is a flowchart that depicts various processes associated with certain embodiments of the present invention. The first process associated with Inventive Procedure 10 is the acquisition of seismic data, including both seismic obtained using a seismic vibrator and surface seismic data, the seismic data having significant harmonic energy using a seismic vibratory source at Acquire Seismic Vibrator Data 12. The direct wave arrival travel times arrivals between the seismic vibrator and an array of seismic receiver locations are then estimated at Estimate Direct Wave Travel Times 14. As discussed below, this process will typically involve correlating the seismic data with either the seismic vibrator reference sweep or an estimate of the actual seismic vibrator source signature and then picking the estimated direct wave arrival times, but other methods can be used to estimate the direct wave arrival travel times between the seismic vibrator and the array of seismic receiver locations. The estimated direct wave travel times are then used with the seismic data in Wavefield Deconvolution 16 to produce deconvolved data. Direct arrivals are removed from the deconvolved data at Remove Direct Wavefield 18 and the resulting reflected arrivals can be displayed in two-way seismic travel time at Display Data in Two-Way Seismic Travel Time 20 and/or input into further seismic data processing or interpretation procedures at Additional Seismic Data Processing/Interpretation 22. Each of these processes will be discussed and described in further detail below.

Figure 2:
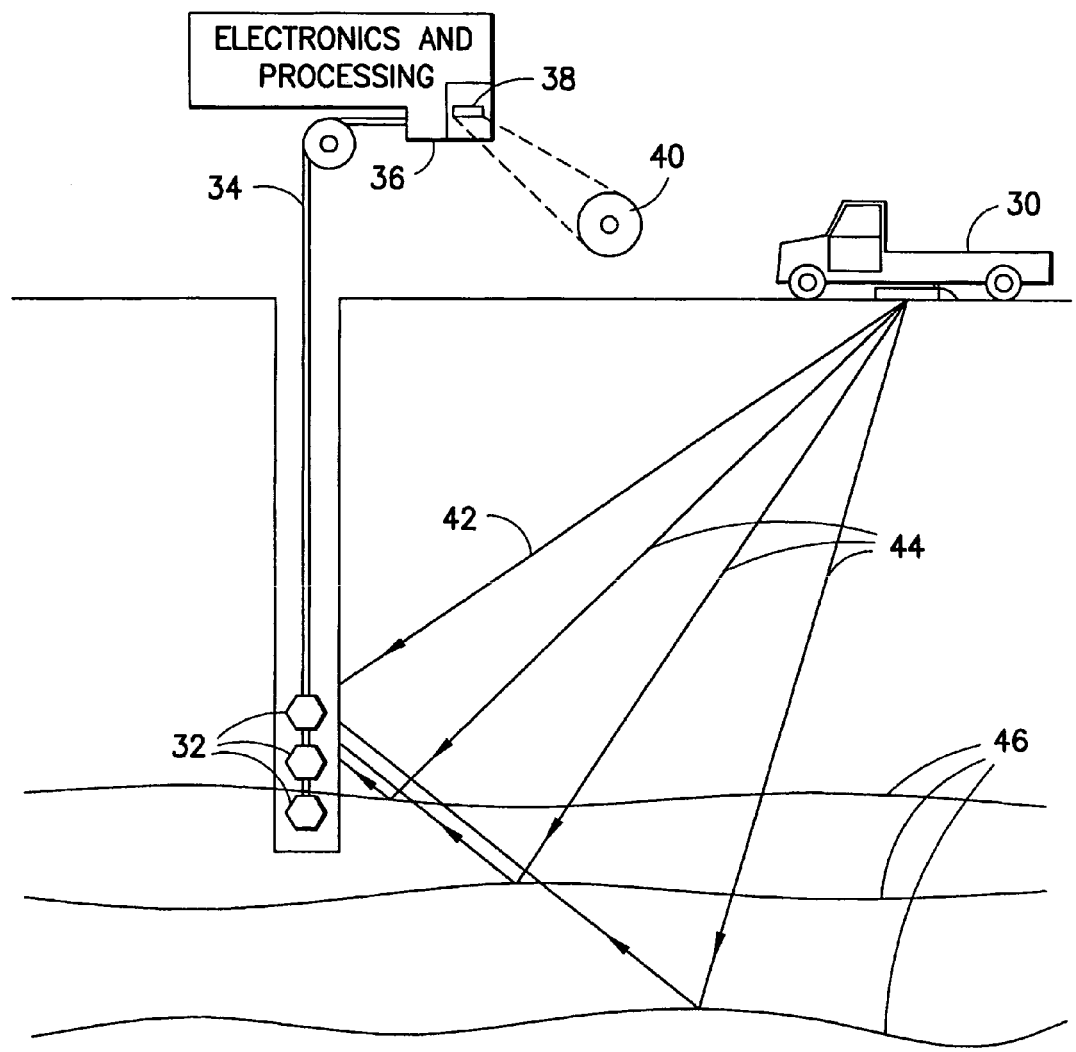
FIG. 2 schematically illustrates the acquisition of Vertical Seismic Profiling data using a seismic vibrator and an array of seismic receivers.

FIG. 2 shows equipment associated with acquiring seismic data in accordance with certain embodiments of the invention. In FIG. 2, a seismic vibrator 30 is deployed on the earth's surface and a plurality of seismic receivers 32 are deployed downhole in a wellbore. The seismic receivers may, for instance, be part of a wireline tool, such as Schlumberger's Versatile Seismic Imager tool, which has four seismic receivers. The seismic receivers may be connected to surface electronics equipment 36 by a wireline cable 34. The surface electronics equipment will typically contain recording hardware that will record the seismic data obtained by the seismic receivers. The surface electronics equipment may also contain a computer processor to process the received data and such a computer processor will typically have a media reader, such as CD drive 38, for reading computer software instructions from a software storage device, such as CD 40. The computer software may allow the computer processor to process the received seismic data and produce a high-frequency geological subsurface image in accordance with the inventive methodology taught herein. It will be understood that various parts of the data processing operations may be performed downhole, performed at the wellsite, or performed away from the wellsite.

In operation, the seismic vibrator 30 produces a series of seismic signals, some of which pass directly through the geologic subsurface and are received by the seismic receivers 32, such as direct arrival 42, and some of which are reflected by geologic interfaces 46 (where differing geologic strata on opposing sides of the interfaces have contrasting acoustic impedances), such as reflected arrivals 46.

After the seismic receivers obtain one series of measurements, the wireline tool (and its associated seismic receivers) are repositioned in the wellbore. The seismic vibrator is maintained in the same position and programmed with the same reference sweep and the recording process is repeated. The term "array of seismic receiver locations" as used herein means a series of locations that allow the upgoing and downgoing wavefields to be separated from seismic data received by seismic receivers positioned at these locations. While a single physical seismic receiver may be used, seismic data must be obtained from an array of seismic receiver locations to allow this separation to take place. In a typical operating environment, the array of seismic receiver locations will consist of a series of at least 5 different locations.

It will be understood to those skilled in the art that various alternatives to the described configuration can be used to acquire and process seismic data using a vibratory seismic source. Some types of seismic vibrators, for instance, are designed to be used under water in a marine data acquisition environment. Instead of forming part of a wireline tool, the seismic sensors may be permanently or semi-permanently installed in the formation or may alternatively form part of a logging while drilling (LWD) tool. Data from the seismic sensors can be transmitted to the surface using permanently or semi-permanently installed cables, using wired drill pipe, using mud pulse transmission systems, using wireless transmission systems, etc. In a marine environment, the array of seismic sensors may be suspended in the water column, such as beneath a buoy.

Figure 3:
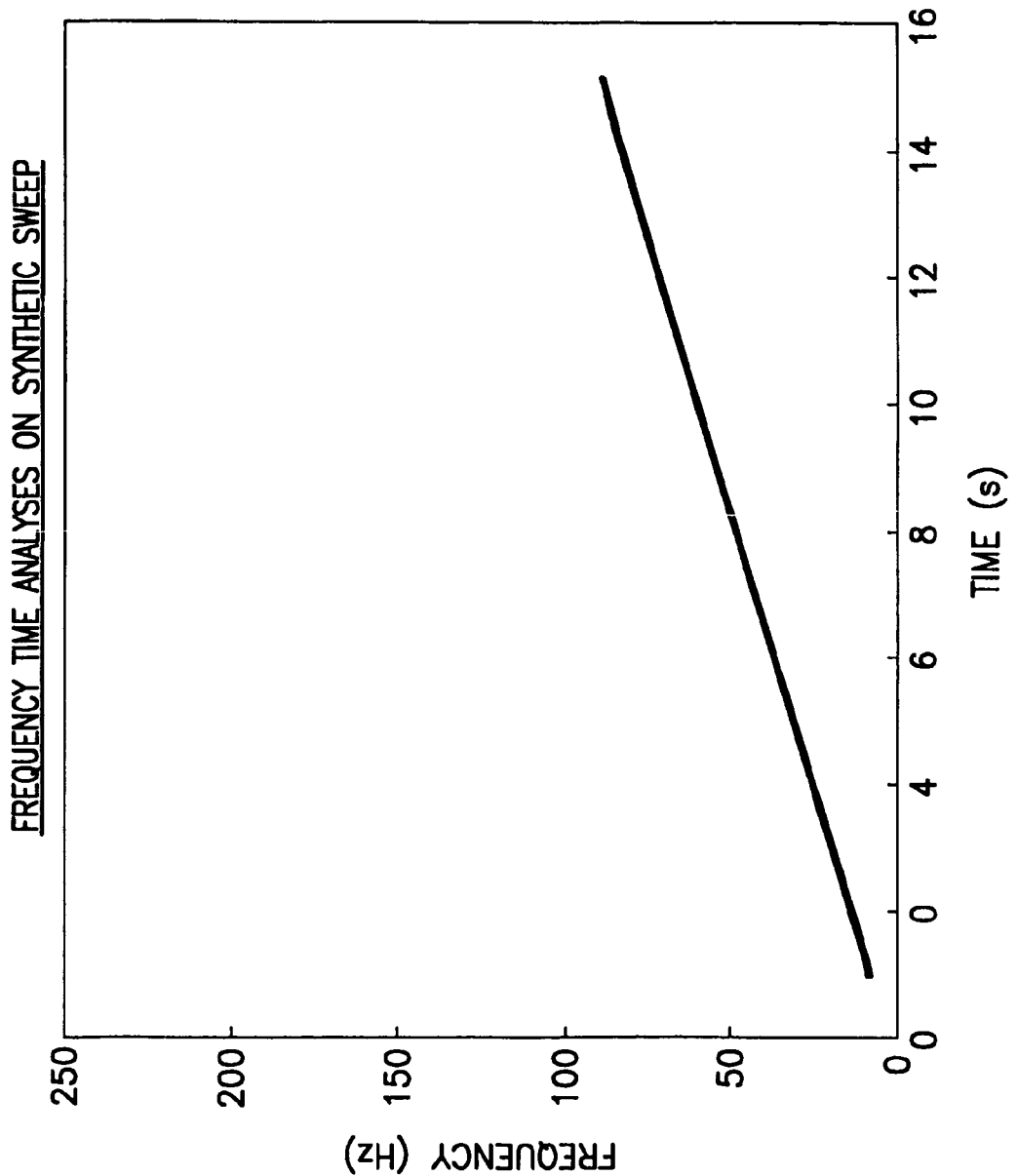
FIG. 3 depicts the instantaneous frequency of a seismic vibrator signature.

The seismic vibrator 30 may have a desired source signature similar to that shown in FIG. 3. In FIG. 3, the instantaneous frequency of the vibrator signature is recorded as a 16 second record, starting at 1 second at a frequency of 8 Hertz and ending at 15 seconds at a frequency of 90 Hertz. As discussed above, this is the vibrator's reference sweep, the source signal that is desired to be transmitted into the subsurface, and does not account for deviations between the actual source signal produced and the desired source signal, such as harmonics. Seismic vibrators typically have minimum and maximum designed operating frequencies and these may be from approximately 5 Hertz to approximately 150 Hertz.

Figure 4:
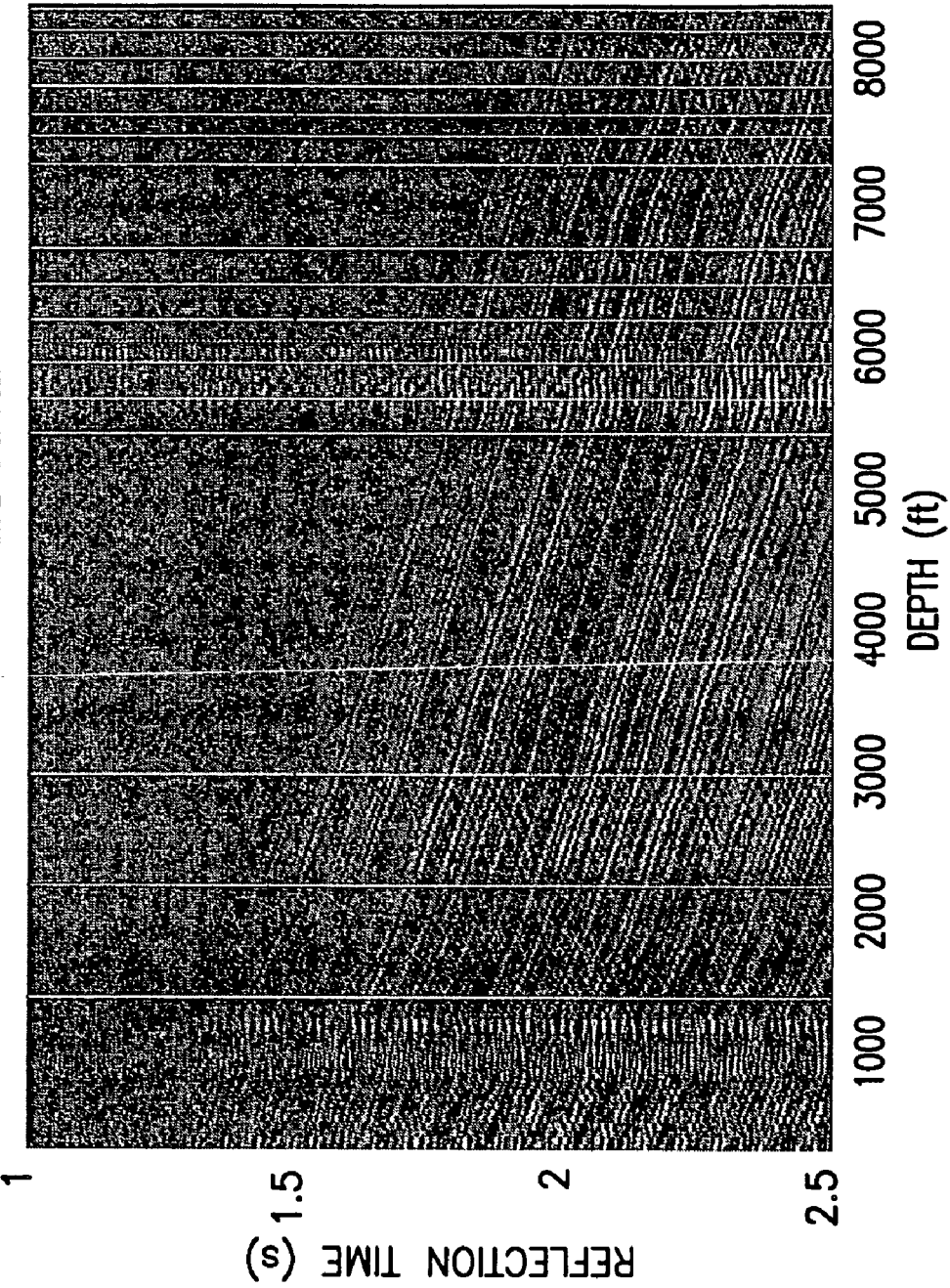
FIG. 4 shows raw data signals recorded by a series of down-hole receivers.

FIG. 4 displays the raw data signals recorded by the downhole seismic receivers located from the surface to a depth of about 9000 feet at about 50 foot intervals. The shallowest 1000 feet of the data were acquired inside casing. A problem with noise or signal quality can be seen at about 6000 feet. This data was obtained using a seismic vibrator having a reference sweep as shown in FIG. 3. As discussed above, this data was obtained by repetitively repositioning Schlumberger's Versatile Seismic Imager tool at different depths in the borehole and maintaining the seismic vibrator at essentially the same position and programmed with the same reference sweep.

Figure 5:
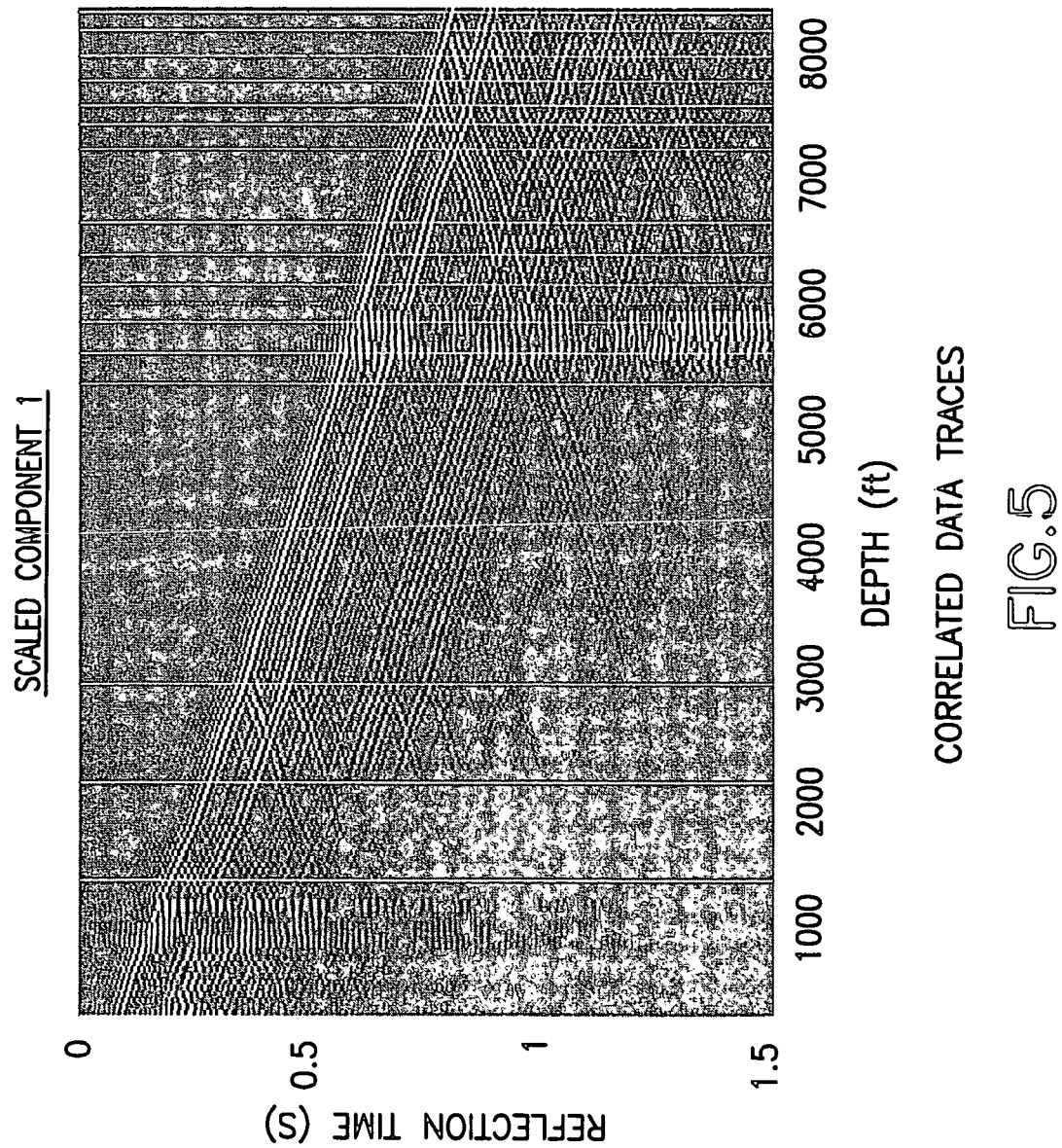
FIG. 5 shows the result of correlating the raw data signals depicted in FIG. 4 with the reference signal analyzed in FIG. 3.

FIG. 5 displays the result of correlating the wavefield shown in FIG. 4 with the reference signal analyzed in FIG. 3. This correlation has condensed the long signature of the seismic vibrator to an approximate impulse. As is typically done, the correlated traces have been truncated to a reasonable length (in this case 2 seconds) before being processed further. From this correlated data, the travel times of direct wave arrivals between the seismic vibrator and the array of seismic receiver locations can be estimated by picking the first breaks/initial arrivals of seismic energy from the seismic vibrator received by seismic receivers at these seismic receiver locations. Other methods for estimating the travel times of direct wave arrivals between the seismic vibrator and the array of seismic receiver locations are also known. For instance, an estimate of the actual source signature (as discussed above) can be used instead of the seismic vibrator's reference signal. The travel times can also be estimated from previous well logging or check shot measurements or even potentially from subsurface velocity models obtained from surface seismic measurements.

To better illustrate the significant benefits that can be obtained by using the inventive method, the data shown in FIG. 5 was subjected to wavefield deconvolution. For this process, a multi-trace least-squares inverse filter of the type described in Haldorsen, J. B. U., Miller, D. E., and Walsh, J., Multichannel Wiener deconvolution of vertical seismic profiles, Geophysics, Vol. 59, No. 10 (October 1994), pp. 1500-1511 (incorporated herein by reference) was used. This filter is a frequency-domain operator with a dual objective; it attempts to spike the direct arrivals and at the same time to minimize the difference between the total recorded field and the estimated direct arrivals. The algebraic solution to this optimization problem can be written as a product between a conventional inverse of the direct down-going field with the semblance associated with the estimation of the signature of the direct down-going field:

$$F_n(\omega) = \frac{f_n^*(\omega)}{E_n(\omega)} = \frac{f_n^*(\omega)}{|f_n(\omega)|^2} \frac{|f_n(\omega)|^2}{E_n(\omega)} \quad [1]$$

$$f_n(\omega) = \langle d_k(\omega) e^{-i\omega t_k} \rangle_{k=n-J,n+J}$$

$$E_n(\omega) = \langle |d_k(\omega)|^2 \rangle_{k=n-J,n+J}$$

Here $\omega$ is the angular frequency, $d_k$ is the data of trace k, and $t_k$ is the first-break time for trace k. The symbol * denotes complex conjugation, and ( ... ) denotes the expectation value. The subscript indicates that the expectation values is taken within a window of width 2J+1 centered on trace n. The symbols $f$ and $E$ represent estimates of down-going direct source signature and the total energy, respectively. Depending on the character of the noise, the expectation value can best be calculated by a mean or a median operation. A median estimator is used below with a spatial length of 7 traces. This will allow the filter to adapt to changes in the source signature consistently present over at least half the spatial length of the filter. It is easily seen from Equation 1 that the spectrum of the deconvolved signature ($F_n(\omega)f(\omega)$) is equal to the semblance spectrum (as discussed in Haldorsen, et al., 1994).

Figure 6:
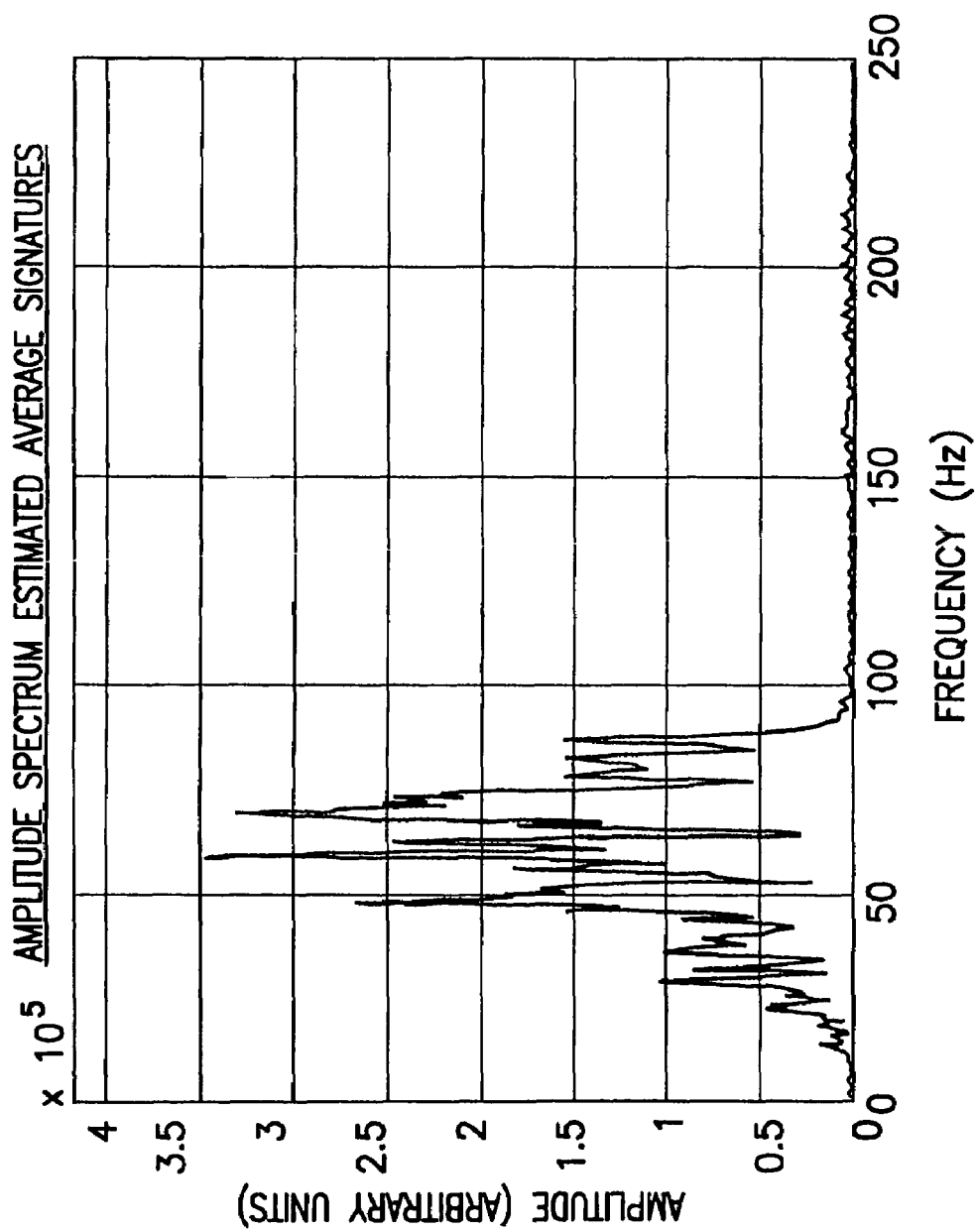
FIG. 6 illustrates the average spectrum of the source signatures of the correlated data traces shown in FIG. 5.
Figure 7:
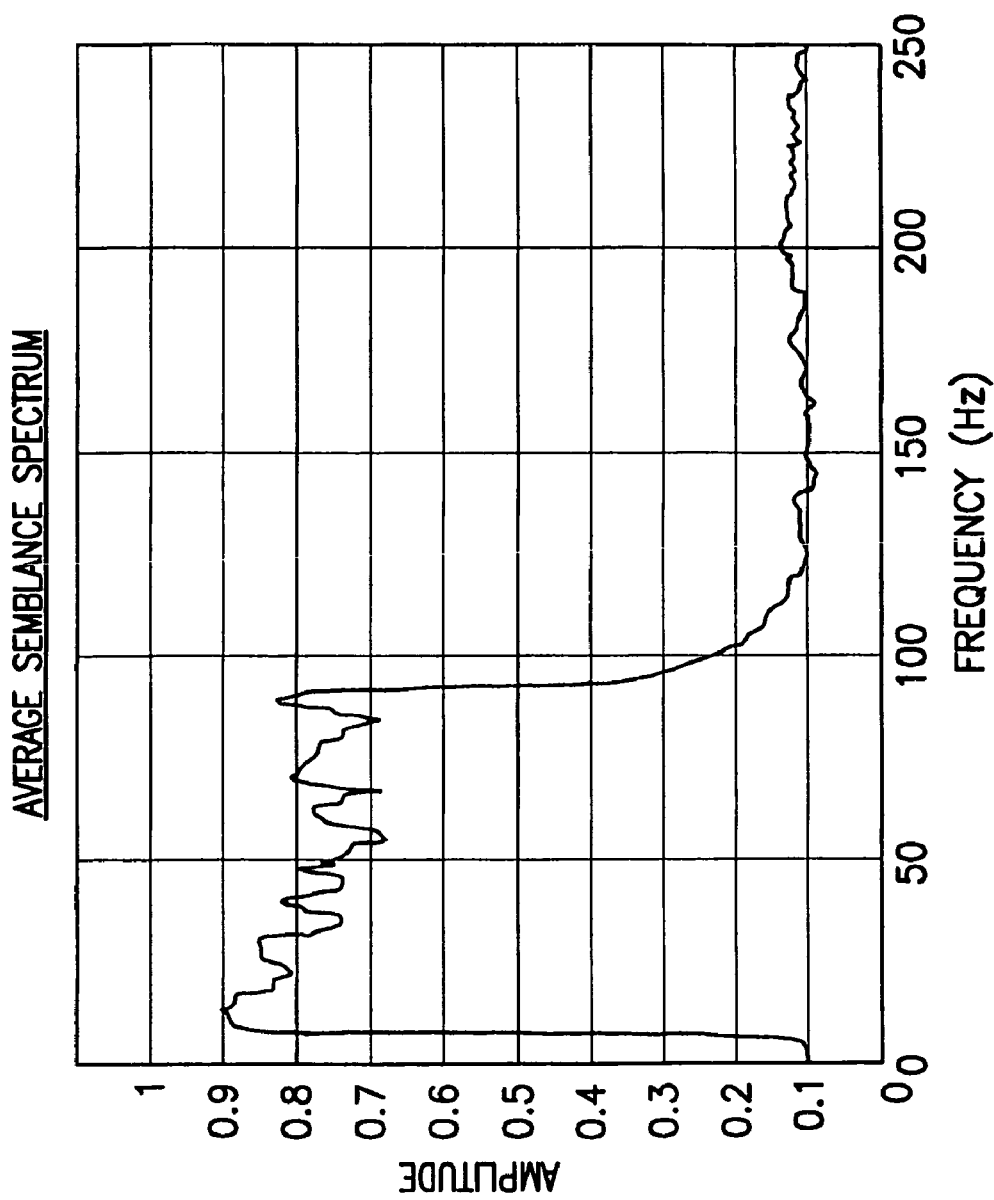
FIG. 7 illustrates the average semblance spectrum of the correlated data shown in FIG. 5.

The average spectrum of the source signatures estimated from the correlated data is shown in FIG. 6. It can be seen in this figure that most of the signal energy falls in the range from 50 to 90 Hertz. The corresponding semblance spectrum, or the spectrum of the deconvolved data, is shown in FIG. 7. This figure shows that the deconvolution process has regained signal from about 8 to 90 Hertz, the entire range of the seismic vibrator reference signal.

Figure 8:
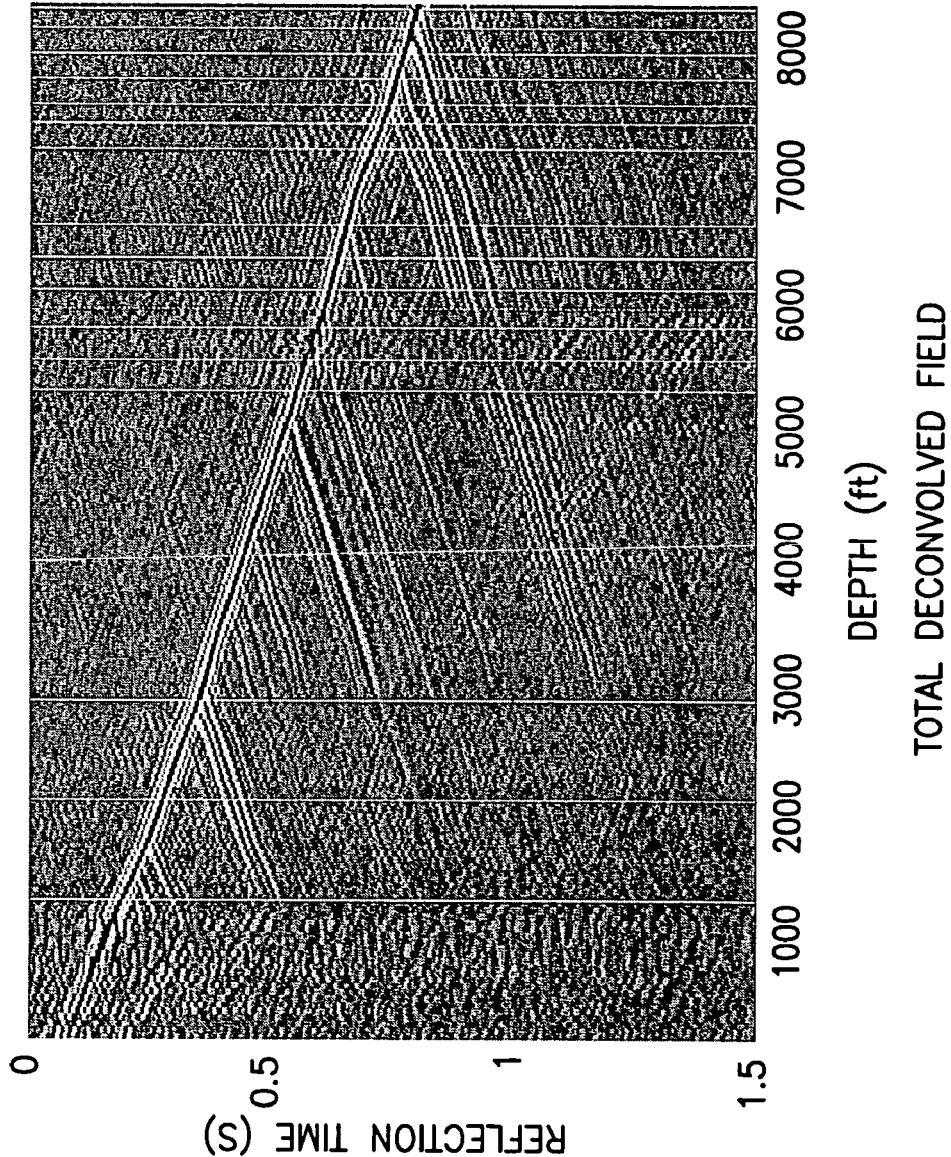
FIG. 8 depicts the total deconvolved field generated by wavefield deconvolving the correlated data shown in FIG. 5.
Figure 9:
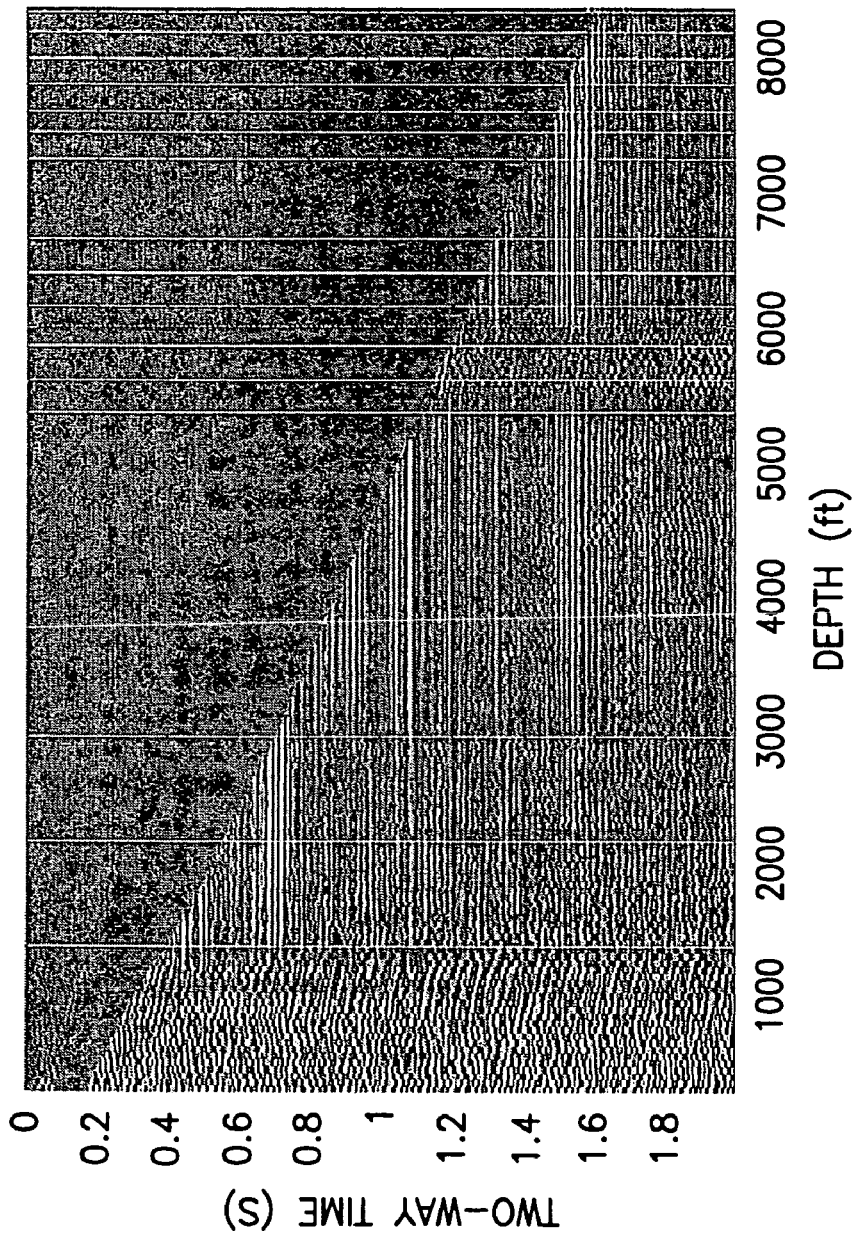
FIG. 9 depicts the result of removing the down-going signal from the data shown in FIG. 8, displayed in seismic two-way travel time.

FIG. 8 shows the total deconvolved field. The down-going signal, estimated using a 7 trace median inverse filter in a sliding window, has been removed. The resulting reflected signal is shown in FIG. 9, displayed in seismic two-way travel time. This way of displaying the data will, for vertical boreholes, align reflectors from flat interfaces. The seismic data shown in FIG. 9 demonstrates the type of geological subsurface image that may be obtained (under these particular circumstances) using conventional seismic data processing techniques.

Figure 10:
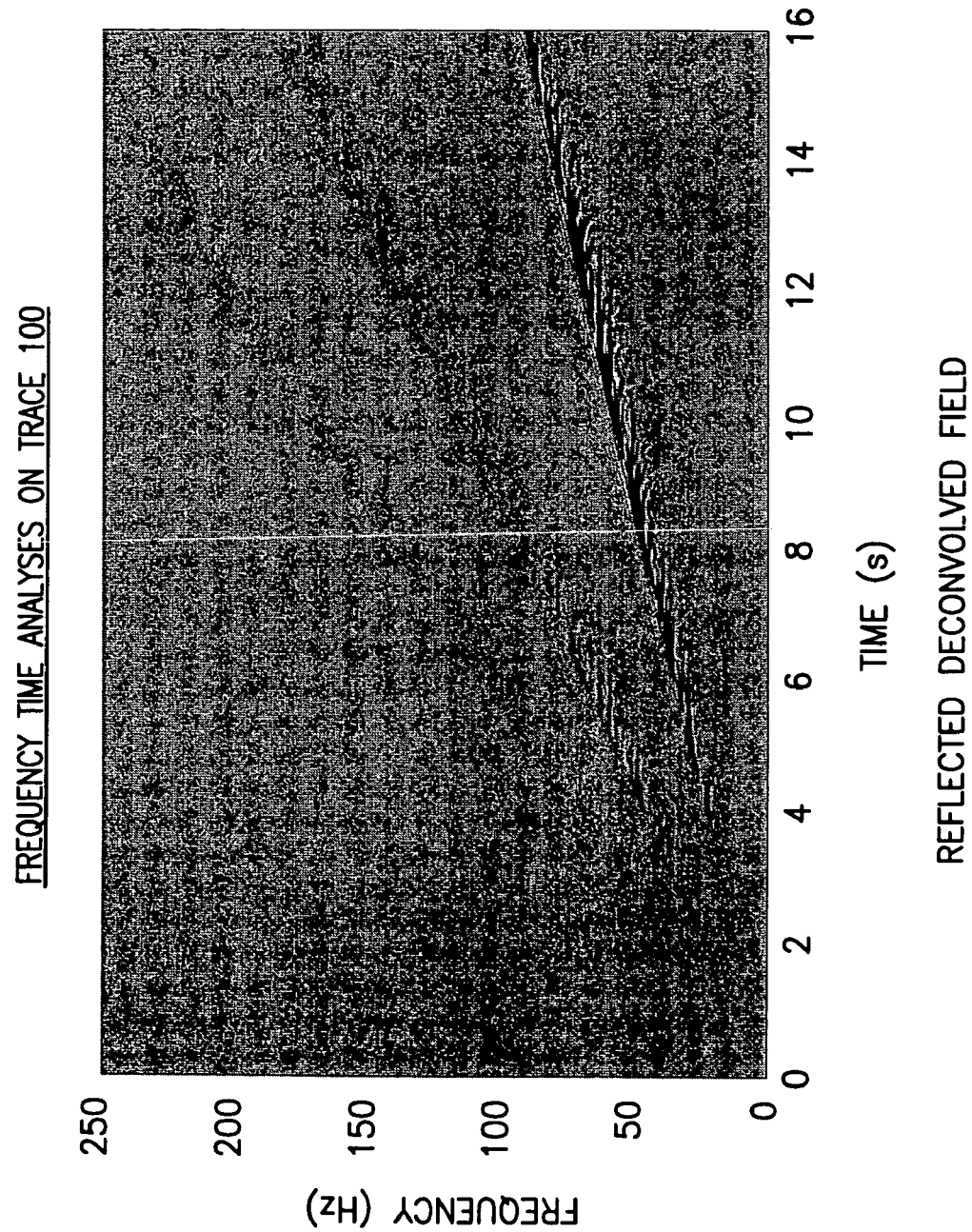
FIG. 10 shows the instantaneous frequency analysis of trace number 100 from the raw data depicted in FIG. 3.

As discussed above, however, the recorded, raw and uncorrelated data (e.g. the seismic data shown in FIG. 4) is actually generated in response to the complete signal of the seismic vibrator, including the harmonic energy. This can be seen in FIG. 10, which shows an instantaneous frequency analysis of trace number 100 from the raw data shown in FIG. 4. The converging strips of higher energy in this figure represent both the fundamental (intended) sweep and the harmonic energy. It is clear from this analysis that the data contain energy not accounted for by the synthetic sweep shown in FIG. 3. In this figure, the darkest line located at approximately 15 degrees from the horizontal, is the intended (reference) sweep, the lighter line located at approximately 30 degrees from the horizontal, are first harmonics, and the barely visible line located at approximately 45 degrees from the horizontal, are second harmonics.

To recover this energy, the total, uncorrelated data is processed, after the correlated data is used to estimate the travel times of the direct waves ($t_k$ in Equation 1). The semblance of the wavefield deconvolution process is preferably used to recover the useable bandwidth of the data. This process is identical to the process described above to process the correlated data: Semblance-Weighted Deconvolution using a 7-trace sliding median estimator. The difference in this case is that the deconvolution process is performed on the uncorrelated data and the estimated travel times of the direct waves are utilized in the process. The 7-trace sliding median estimator is particularly appropriate in this case because the data was obtained using a wireline tool having 4 seismic receivers and it is preferred to have the number of seismic receivers being used simultaneously to acquire the seismic data to be greater than one half of the number of traces used in the sliding median estimator.

Figure 11:
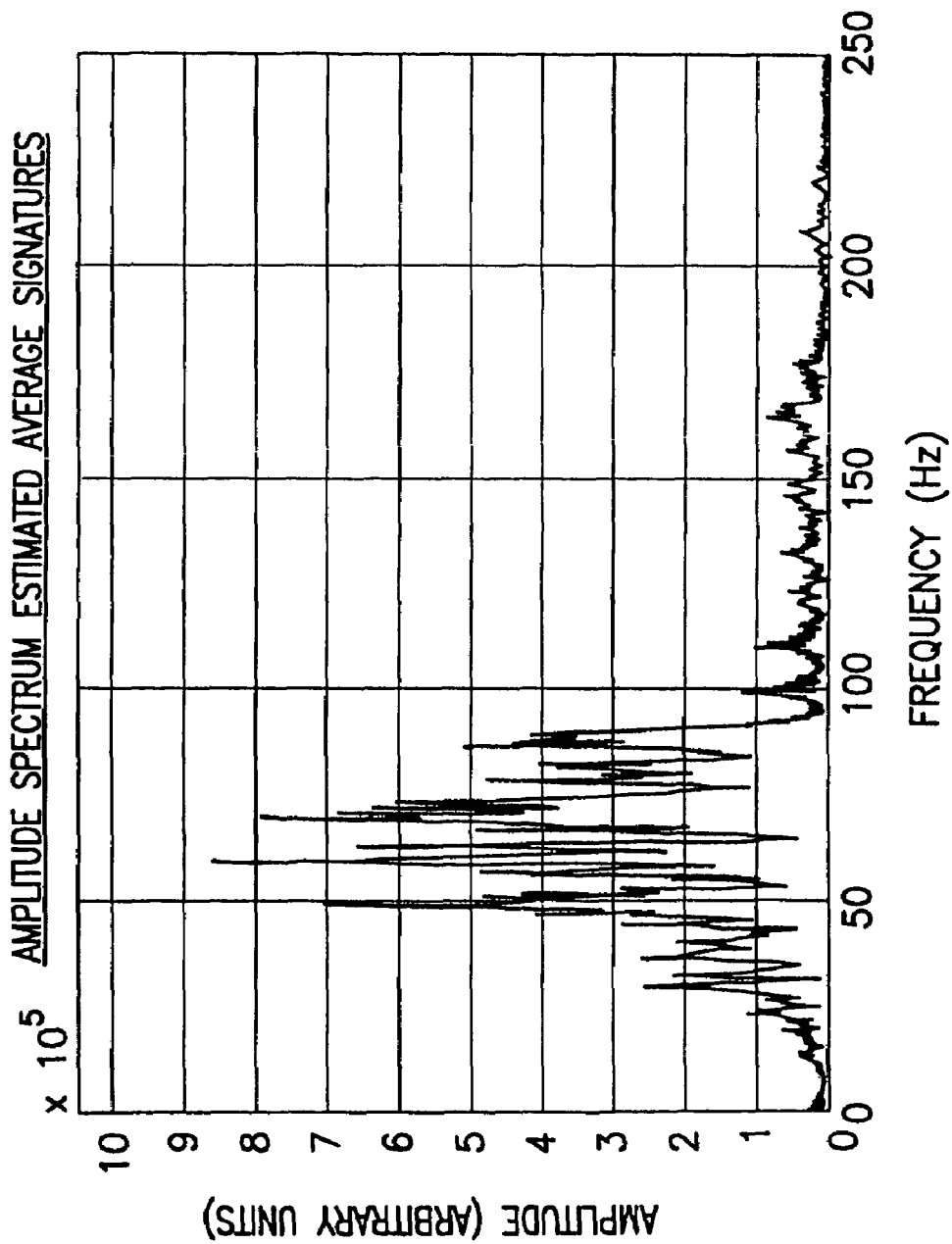
FIG. 11 depicts the average amplitude spectrum of the estimated signature resulting from Semblance-Weighted Deconvolution of the uncorrelated data.
Figure 12:
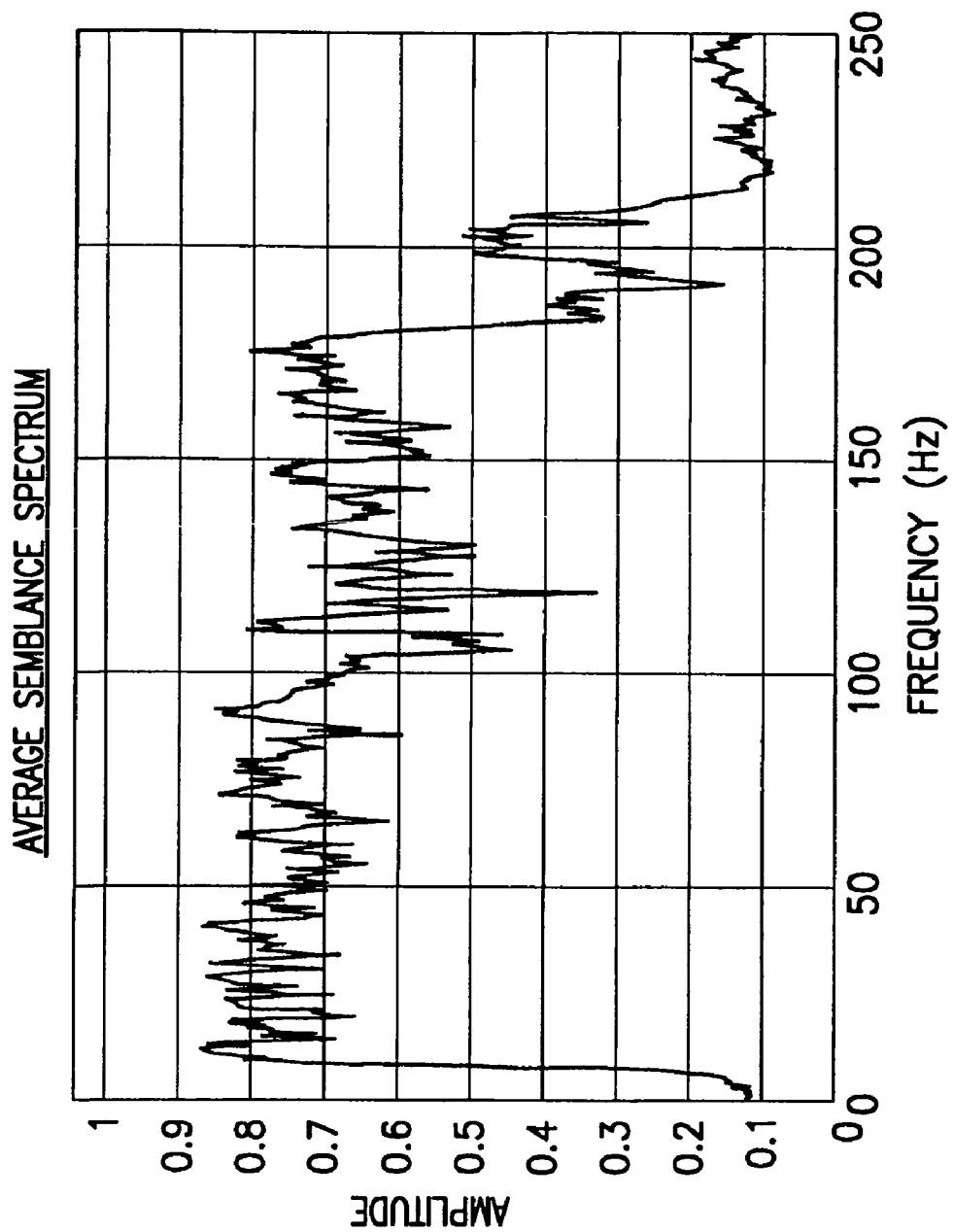
FIG. 12 depicts the average semblance spectrum of the data output from Semblance-Weighted Deconvolution of the uncorrelated data.
Figure 13:
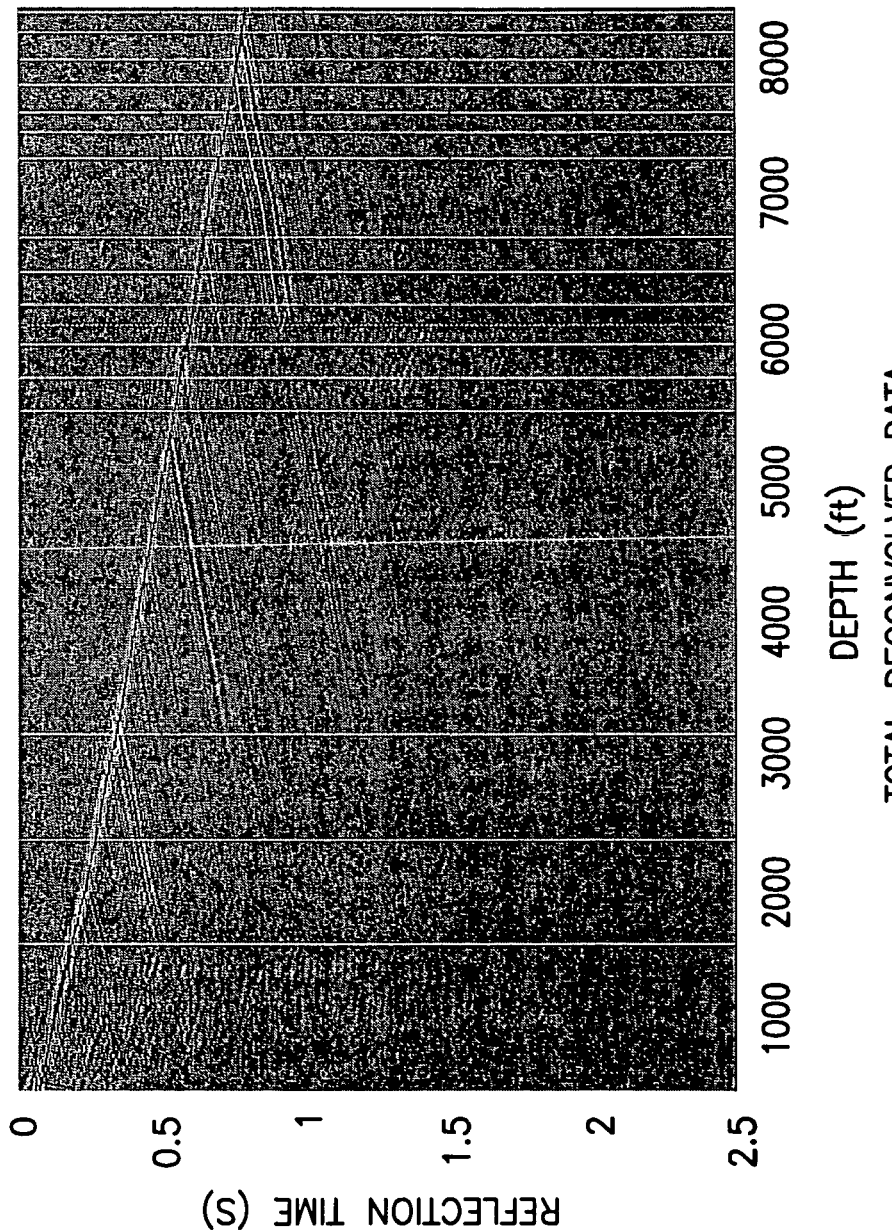
FIG. 13 depicts the total deconvolved field generated by wavefield deconvolving the uncorrelated data shown in FIG. 4.
Figure 14:
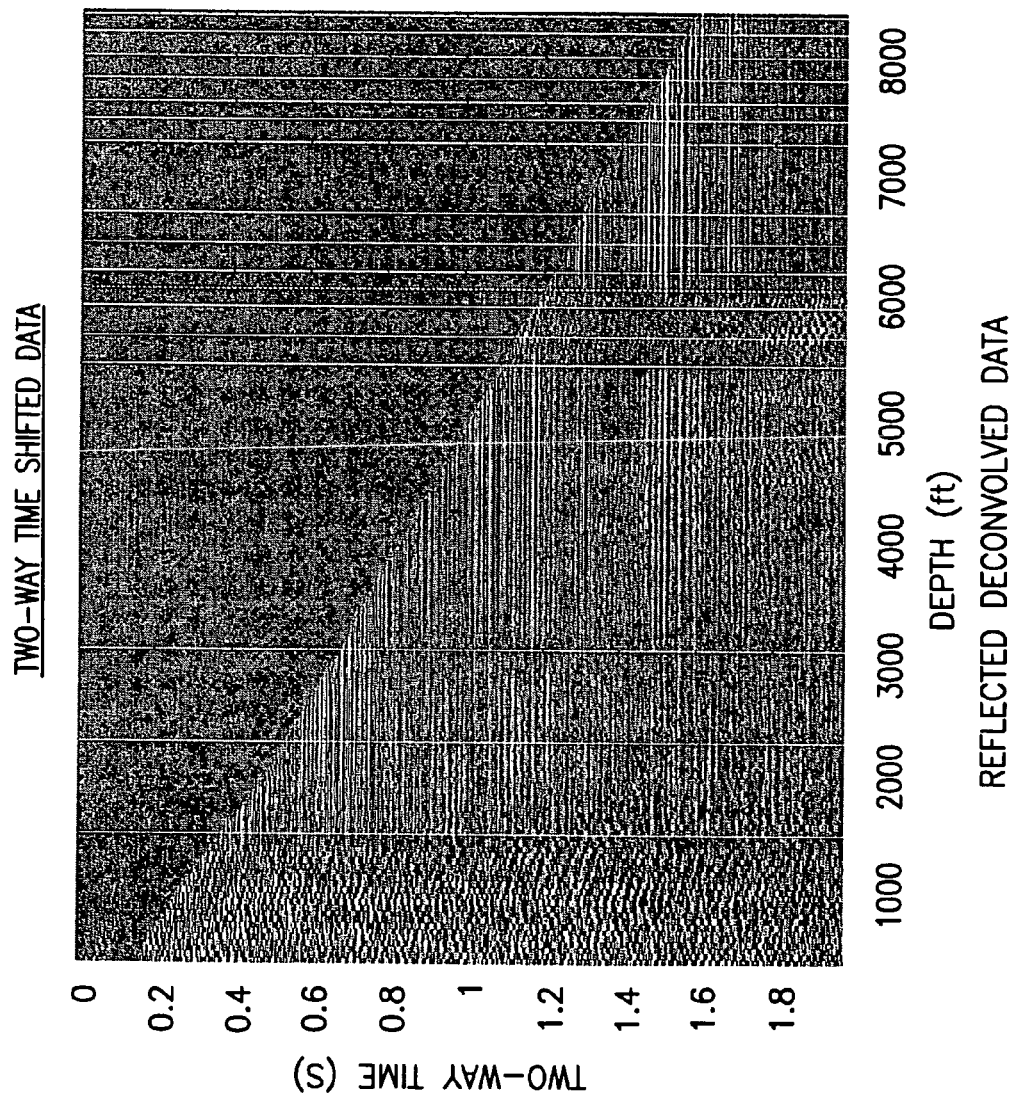
FIG. 14 depicts the result of removing the down-going signal from the data shown in FIG. 13, displayed in seismic two-way travel time.

FIG. 11 gives the average spectrum of the estimated source signature from the raw uncorrelated data and FIG. 12 shows the average semblance spectrum of the source signature estimated from the raw uncorrelated data. Most of the energy visible in the spectrum of the source signature between 90 and 175 Hertz are from first harmonics, whereas the energy above 175 Hertz is from higher harmonics. The semblance spectrum shows that virtually all of this energy is recovered by the processing sequence. FIGS. 13 and 14 show the deconvolved wavefield, again demonstrating that the data now has extremely high resolution, to about 200 Hertz in bandwidth. In FIG. 14, the direct arrivals have been removed from the data shown in FIG. 13 and the results are displayed in two way travel time. Those skilled in the art will appreciate that the seismic data displayed in FIG. 14 can be used as input into various further seismic data processing and/or seismic data interpretation methods.

Updated estimates of travel times of direct wave arrivals between the seismic vibrator and the array of seismic receiver locations can also be obtained by picking the first breaks/initial arrivals from the deconvolved seismic data and these updated estimates can be used as input into another iteration of Wavefield Deconvolution 16. This is shown as a dotted line in FIG. 1.

Figure 15:
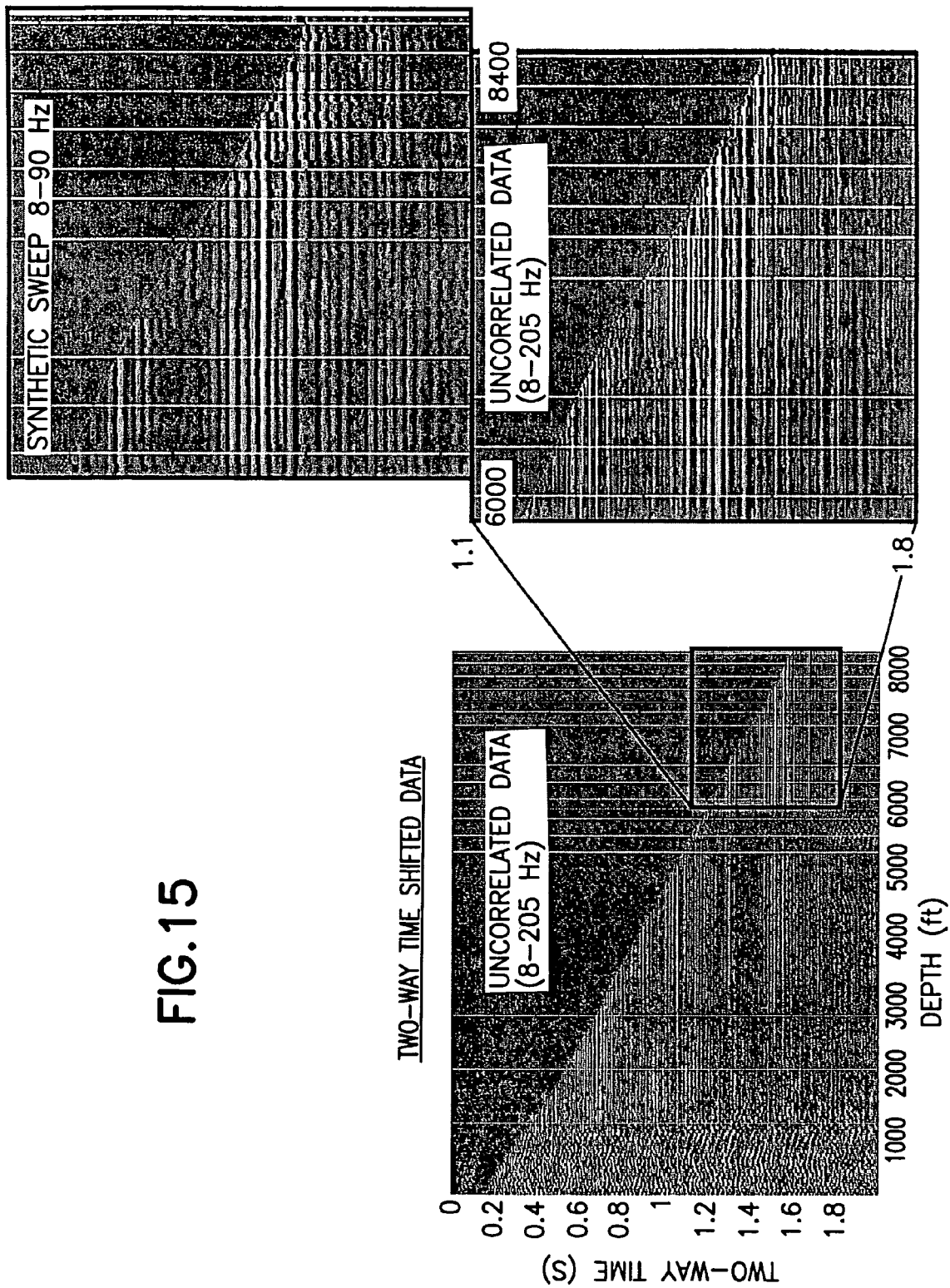
FIG. 15 compares geological subsurface images created by conventional means and the inventive method.
Figure 1:
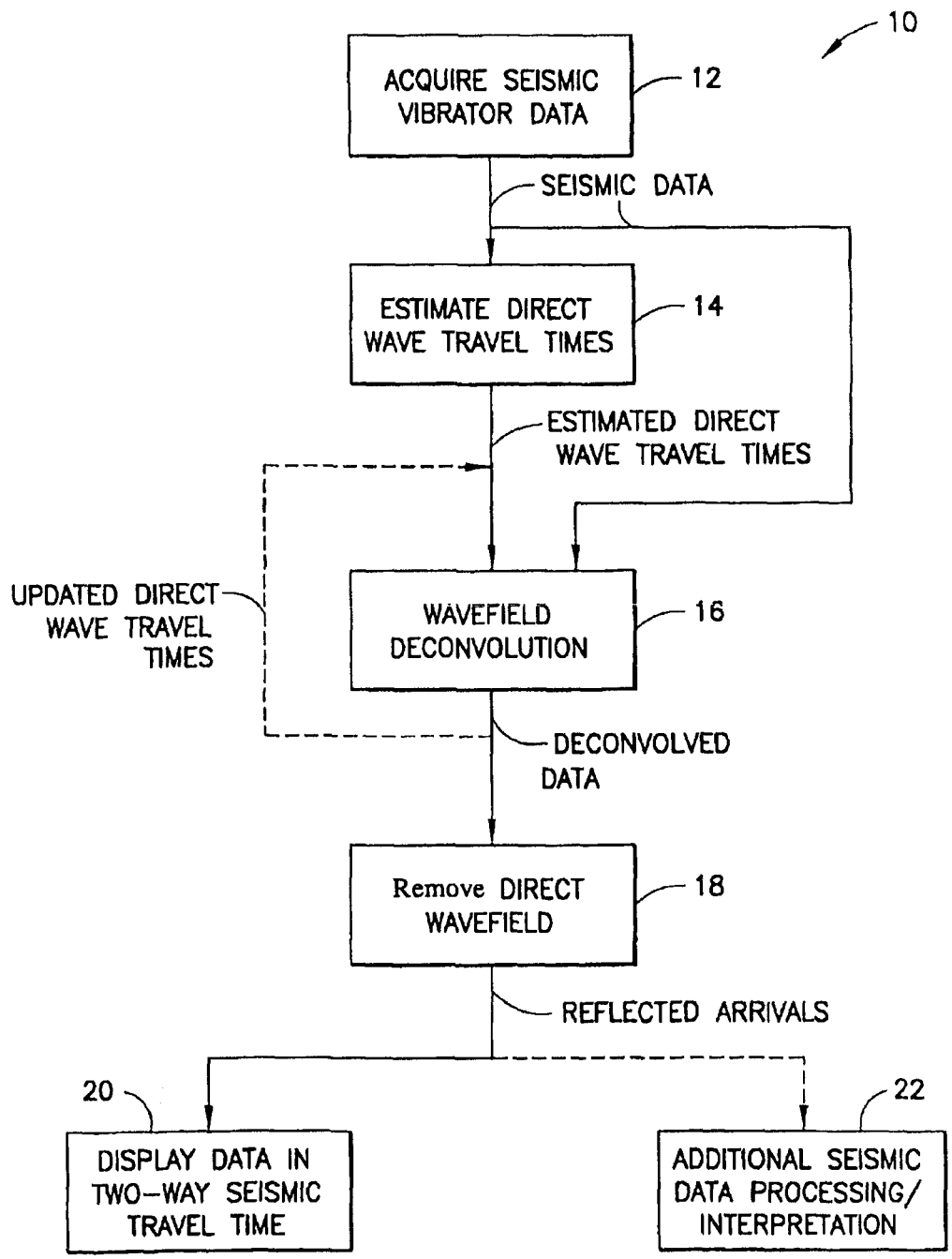

FIG. 15 shows a detailed comparison between the conventionally processed (8-90 Hertz) data and the full-bandwidth (8-207 Hertz) data produced using the inventive method. FIG. 15 clearly demonstrates that much higher resolution is obtained when appropriate processing is applied to the uncorrelated data. The ability of the Semblance-Weighted Deconvolution process to retrieve the relatively weak energy beyond the limits of the intended sweep shows that despite the low signal level, the noise level is lower, leaving the signal-to-noise ratio reasonably good.

The inventive method has two primary benefits; it produces data with less noise because the harmonic energy is not smeared by being improperly handled during processing and the appropriate use of higher frequency harmonic energy as signal produces a more detailed image of the subsurface area being investigated.

To increase the benefits obtained using the inventive method, it may be desirable to allow or intentionally modify the seismic vibrator (or a group of vibrators) used to acquire seismic data to increase the fraction of energy imparted into the subsurface in the form of harmonics. Proper processing of this harmonic energy may allow more efficient seismic vibrator designs because the production of the harmonic energy does not need to be minimized or avoided.

If surface seismic data and VSP data are acquired simultaneously, the deconvolution operator obtained while processing the VSP seismic data in accordance with the inventive methodology may advantageously be used to produce higher-frequency versions of the surface seismic data traces.

While the invention has been described herein with reference to certain examples and embodiments, it will be evident that various modifications and changes may be made to the embodiments described above without departing from the scope and spirit of the invention as set forth in the claims. It will be understood, for instance, that various modifications may be made to the particular wavefield deconvolution algorithms described above. Instead of using a semblance weighted deconvolution operator, alternative operators could be used that, for instance, assign or assume a particular amplitude versus frequency semblance relationship in the data. It will also be understood that the seismic data being wavefield deconvolved is not required to be the raw, uncorrelated, unprocessed versions of the data received by the seismic receivers. The wavefield deconvolution process is capable of effectively operating on pre-processed versions of the seismic data provided the seismic data is not pre-processed in ways that significantly band limit or corrupt the data. It will also be understood that the seismic receivers used may comprise multi-component seismic data sensors.

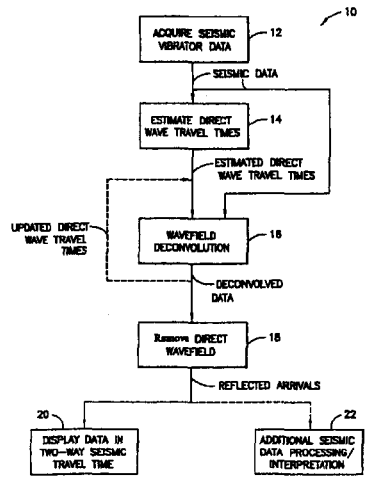

I claim:

1. A method of processing seismic data obtained using a seismic vibrator, comprising:
   estimating travel times of direct wave arrivals between said seismic vibrator and an array of seismic receiver locations using correlated seismic data; and
   wavefield deconvolving uncorrelated seismic data using said estimated direct wave arrival travel times; wherein said deconvolved seismic data is used to recover the total useable bandwidth of the seismic data obtained using a seismic vibrator whereby the total useable bandwidth is determined using the semblance of the wavefield deconvolution process and the uncorrelated seismic data is used to extract a down-going wave field, wherein components of the down-going wave field associated with harmonic distortion are accounted for and thereby become part of the total bandwidth of the processed seismic data.

2. A method in accordance with claim 1, wherein said travel times of direct wave arrivals between said seismic vibrator and said array of seismic receiver locations are estimated using said seismic data.

3. A method in accordance with claim 2, wherein estimating said travel times of direct wave arrivals between said seismic vibrator and said array of seismic receiver locations comprises correlating said seismic data with said seismic vibrator's reference signal or an estimate of seismic vibrator's actual source signature and picking first breaks/initial arrivals of seismic energy from said correlated seismic data.

4. A method in accordance with claim 1, wherein said wavefield deconvolution is semblance-weighted.

5. A method in accordance with claim 1, wherein said wavefield deconvolution comprises calculating an expectation value by a mean or a median operation.

6. A method in accordance with claim 5, wherein a median estimator is used having a spatial length of 7 traces.

7. A method in accordance with claim 1, wherein updated estimates of said travel times of direct wave arrivals between the seismic vibrator and an array of seismic receiver locations are obtained by picking first breaks/initial arrivals from said wavefield deconvolved seismic data and said updated estimates are used as input into a further wavefield deconvolving of said seismic data using said updated estimated direct wave arrival travel times.

8. A method in accordance with claim 1, further comprising removing direct wavefield energy from said wavefield deconvolved seismic data and displaying said data in two-way seismic travel time.

9. A method in accordance with claim 1, wherein said seismic data and surface seismic data are acquired simultaneously and a deconvolution operator determined during said wavefield deconvolving is used in processing said surface seismic data.

10. A method of producing a high-frequency geological subsurface image, comprising:
   acquiring seismic data having significant harmonic energy using a seismic vibrator;
   estimating direct wave arrival travel times between said seismic vibrator and an array of seismic receiver locations using correlated data;
   wavefield deconvolving uncorrelated seismic data using said estimated direct wave arrival travel times; and
   using said wavefield deconvolved seismic data to produce a high-frequency geological subsurface image; wherein said deconvolved seismic data is used in the recovery of the total useable bandwidth of the seismic data having significant harmonic energy obtained using a seismic vibrator whereby the total useable bandwidth is determined using the semblance of the wavefield deconvolution process and the uncorrelated seismic data is used to extract a down-going wave field, wherein components of the down-going wave field associated with harmonic distortion are accounted for and thereby become part of the total bandwidth of the processed seismic data.

11. A method in accordance with claim 10, wherein said travel times of direct wave arrivals between said seismic vibrator and said array of seismic receiver locations are estimated using said seismic data.

12. A method in accordance with claim 11, wherein estimating said travel times of direct wave arrivals between said seismic vibrator and said array of seismic receiver locations comprises correlating said seismic data with said seismic vibrator's reference signal or an estimate of seismic vibrator's actual source signature and picking first breaks/initial arrivals of seismic energy from said correlated seismic data.

13. A method in accordance with claim 10, wherein said wavefield deconvolution is semblance-weighted.

14. A method in accordance with claim 10, wherein said wavefield deconvolution comprises calculating an expectation value by a median operation and a median estimator is used having a spatial length of 7 traces.

15. A method in accordance with claim 10, wherein updated estimates of said travel times of direct wave arrivals between the seismic vibrator and an array of seismic receiver locations are obtained by picking first breaks/initial arrivals from said wavefield deconvolved seismic data and said updated estimates are used as input into a further wavefield deconvolving of said seismic data using said updated estimated direct wave arrival travel times.

16. A method in accordance with claim 10, further comprising removing direct wavefield energy from said wavefield deconvolved seismic data and displaying said data in two-way seismic travel time.

17. A method in accordance with claim 10, wherein said seismic data and surface seismic data are acquired simultaneously and a deconvolution operator determined during said wavefield deconvolving is used in processing said surface seismic data.

18. An article of manufacture, comprising:
a computer useable medium having computer readable program code means embodied therein for processing seismic data obtained using a seismic vibrator, the computer readable program code means in said article of manufacture comprising:
computer readable program means for estimating travel times of direct wave arrivals between said seismic vibrator and an array of seismic receiver locations using correlated data; and
computer readable program means for wavefield deconvolving uncorrelated seismic data using said estimated direct wave arrival travel times;
wherein said deconvolved seismic data is used in the recovery of to the total useable bandwidth of the seismic data obtained using a seismic vibrator whereby the total useable bandwidth is determined using the semblance of the wavefield deconvolution process and the uncorrelated seismic data is used to extract a down-going wave field, wherein components of the down-going wave field associated with harmonic distortion are accounted for and thereby become part of the total bandwidth of the processed seismic data.

* * * * *

UNITED STATES PATENT AND TRADEMARK OFFICE
CERTIFICATE OF CORRECTION

PATENT NO.        : 7,508,733 B2
APPLICATION NO.   : 10/987907
DATED             : March 24, 2009
INVENTOR(S)       : Jakob B. U. Haldorsen It is certified that error appears in the above-identified patent and that said Letters Patent is hereby corrected as shown below:

The title page showing the illustrative figure should be deleted to be replaced with the attached title page.

The drawing sheet, consisting of Fig. 1, should be deleted to be replaced with the drawing sheet, consisting of Fig. 1, as shown on the attached page.

Signed and Sealed this

Sixth Day of April, 2010

David J. Kappos
*Director of the United States Patent and Trademark Office*

(12) United States Patent
Haldorsen

(10) Patent No.: US 7,508,733 B2
(45) Date of Patent: Mar. 24, 2009

(54) HIGH-FREQUENCY PROCESSING OF SEISMIC VIBRATOR DATA

(75) Inventor: Jakob B. U. Haldorsen, Norwalk, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 10/987,907

(22) Filed: Nov. 12, 2004

(65) Prior Publication Data

US 2005/0122840 A1 Jun. 9, 2005

Related U.S. Application Data

(60) Provisional application No. 60/520,175, filed on Nov. 14, 2003.

(51) Int. Cl.
*G01V 1/36* (2006.01)
*G01V 1/37* (2006.01)
(52) U.S. Cl. .............. 367/41; 367/40; 367/42; 367/189
(58) Field of Classification Search ......... 367/37–38, 367/40–42, 48, 57, 43, 189
See application file for complete search history.

(56) References Cited

U.S. PATENT DOCUMENTS

| 3,705,382 | A | * | 12/1972 | Quay | 367/51 |
| 4,646,274 | A | | 2/1987 | Martinez | 367/41 |
| 4,715,021 | A | * | 12/1987 | Dittert | 702/17 |
| 4,926,391 | A | * | 5/1990 | Rector et al. | 367/41 |
| 5,148,407 | A | * | 9/1992 | Haldorsen et al. | 367/32 |
| 5,191,557 | A | * | 3/1993 | Rector et al. | 367/41 |
| 5,400,299 | A | * | 3/1995 | Trantham | 367/43 |
| 5,461,594 | A | * | 10/1995 | Mougenot et al. | 367/48 |

(Continued)

FOREIGN PATENT DOCUMENTS

GB 2 365 529 A 2/2002

(Continued)

OTHER PUBLICATIONS

Haldorsen, J. B. U. et al. "Multichannel Wiener Deconvolution of Vertical Seismic Profiles", *Geophysics*, vol. 59 (Oct. 1994), pp. 1500-1511.

(Continued)

*Primary Examiner*—Jack W. Keith
*Assistant Examiner*—Scott A Hughes
(74) *Attorney, Agent, or Firm*—James McAleenan; Vincent Loccisano; Jody Lynn DeStefanis

(57) ABSTRACT

A method of processing seismic data obtained using a seismic vibrator that includes estimating travel times of direct wave arrivals between the seismic vibrator and an array of seismic receiver locations and wavefield deconvolving the seismic data using the direct wave arrival travel times. Also a related method of producing a high-frequency geological subsurface image that includes acquiring seismic data having significant harmonic energy using a seismic vibrator, estimating direct wave arrival travel times between the seismic vibrator and an array of seismic receiver locations, wavefield deconvolving the seismic data using the estimated direct wave arrival travel times, and using the wavefield deconvolved seismic data to produce a high-frequency geological subsurface image. A further related computer useable medium having computer readable program code means embodied therein practicing the inventive method.

18 Claims, 15 Drawing Sheets